(No Model.) 4 Sheets—Sheet 1.

C. SEYMOUR.
MACHINE FOR JOINTING AND FACING CARRIAGE AND WAGON SPOKES.

No. 437,251. Patented Sept. 30, 1890.

Witnesses
G. F. Downing
S. J. Nottingham

Inventor
Charles Seymour
By Leggett & Leggett
Attys (No Model.) 4 Sheets—Sheet 3.

C. SEYMOUR.
MACHINE FOR JOINTING AND FACING CARRIAGE AND WAGON SPOKES.

No. 437,251. Patented Sept. 30, 1890.

Witnesses
G. F. Downing
S. J. Nottingham

Inventor
Charles Seymour
By Leggett and Leggett
Attys.

(No Model.) 4 Sheets—Sheet 4.
C. SEYMOUR.
MACHINE FOR JOINTING AND FACING CARRIAGE AND WAGON SPOKES.
No. 437,251. Patented Sept. 30, 1890.
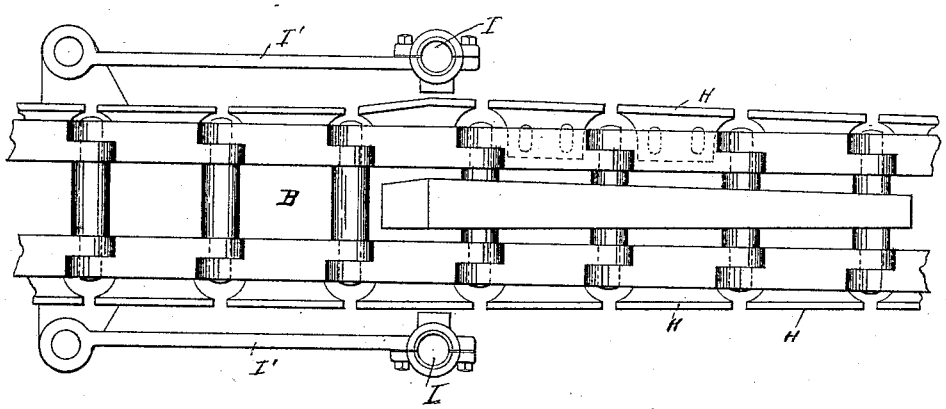

UNITED STATES PATENT OFFICE.

CHARLES SEYMOUR, OF DEFIANCE, OHIO, ASSIGNOR TO THE DEFIANCE MACHINE WORKS, OF SAME PLACE.

MACHINE FOR JOINTING AND FACING CARRIAGE AND WAGON SPOKES.

SPECIFICATION forming part of Letters Patent No. 437,251, dated September 30, 1890.

Application filed April 28, 1890. Serial No. 349,800. (No model.)

*To all whom it may concern:*

Be it known that I, CHARLES SEYMOUR, of Defiance, in the county of Defiance and State of Ohio, have invented certain new and useful Improvements in Machines for Jointing and Facing Carriage and Wagon Spokes; and I do hereby declare the following to be a full, clear, and exact description of the invention, such as will enable others skilled in the art to which it appertains to make and use the same.

My invention relates to an improvement in machines for jointing or facing wagon and carriage spokes, the object being to provide a machine which will economize time and machinery in the process of dressing spokes and preparing them for use; and with this end in view my invention consists in an endless bed or linked table for carrying the spokes through the machine and clamping devices for holding the spokes on the bed or table, in combination with cutter-heads and mechanism for driving and guiding the cutter-heads and for automatically gripping and releasing the spokes at the proper intervals.

It further consists in certain novel features of construction and combinations of parts, as will be hereinafter described, and pointed out in the claims.

Figure 1:
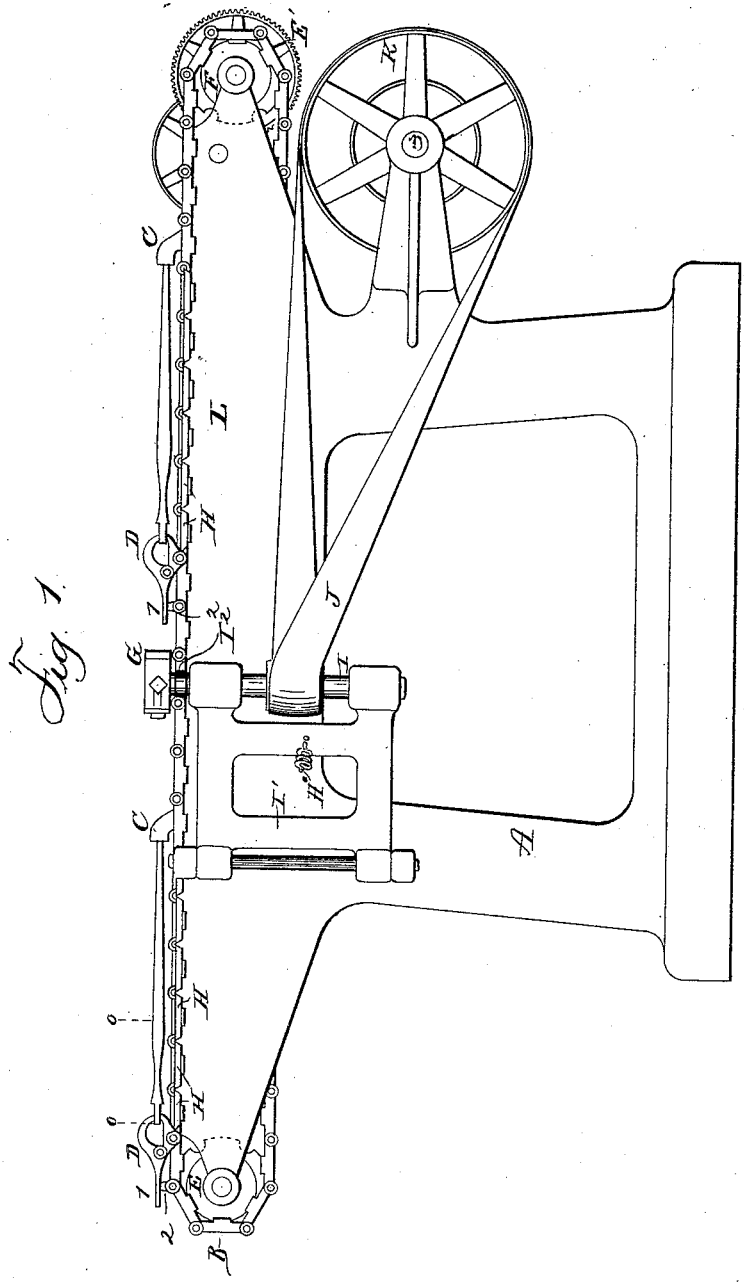
Figure 2:
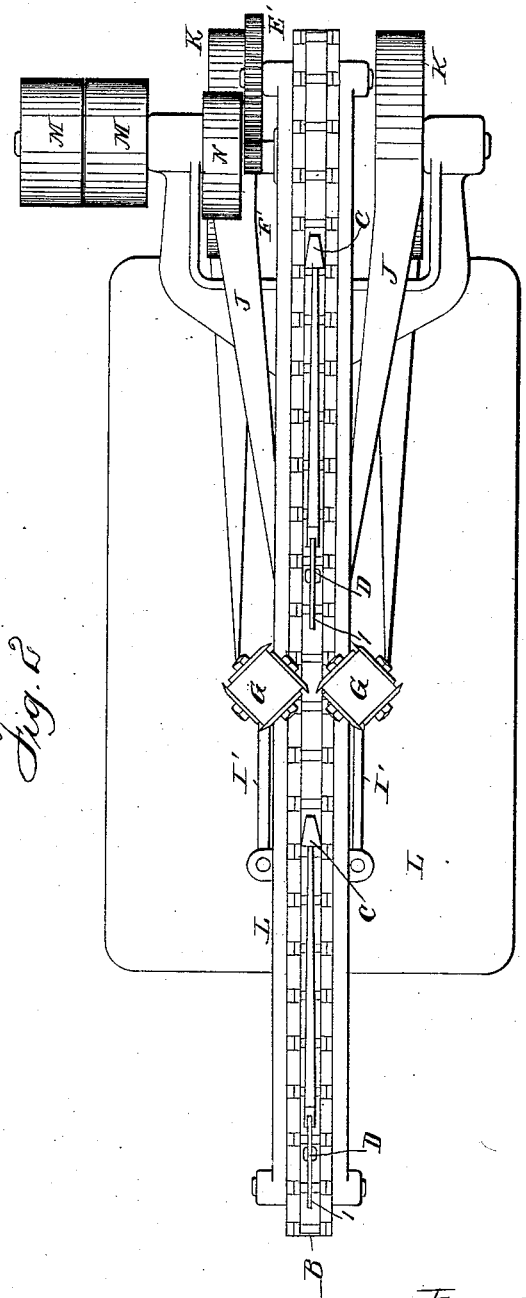
Figure 3:
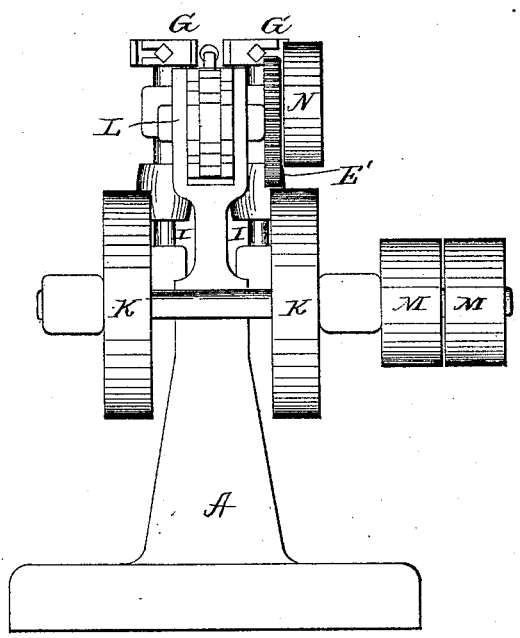

In the accompanying drawings, Figure 1 is a side elevation of my improved machine. Fig. 2 is a plan view. Fig. 3 is an end elevation, and Fig. 4 is an enlarged view showing the adjustable gages H.

A represents the frame of the machine, the horizontal portion L of which is preferably made integral therewith and of suitable length to accommodate the amount of work to be done conveniently to hold one or more spokes in transit at one time. An endless bed or linked table B travels from one end to the other of this horizontal portion over sprocket-wheels or equivalent driving mechanism E and F, and this bed or table B is driven by means of intermeshed gear-wheels E' F' and belt-wheel N. On this bed or table the conical-shaped recesses or sockets C C are located at suitable distances apart, the number of them of course depending on the length of the bed or table and the number of spokes it is calculated to carry. These recesses are intended to receive one end of the spokes as they are fed to the machine by the operator, and clamps D are located the length of the spokes from the recesses or sockets C C, and they are adapted to automatically clutch the rear end of the spokes, and this action is produced by one jaw being rigid on the bed or table and the other pivoted, and the latter has a long stem or handle 1 at its rear end, which is struck by lug 2 as soon as the bed or table assumes its horizontal position after passing over the sprocket-wheel, to automatically grasp and securely hold the spoke, so that the spokes are firmly held during their transit between the sprocket-wheels, and they are released as soon as the recess or socket C and the clamp D reach the next wheel, one end of course being released and then the other.

Cutter-heads G G are mounted on the upper ends of vertical shafts I I, and the latter are revolubly supported either in reciprocating or slide frames or in the swinging frames I' I', as shown. These cutter-heads operate simultaneously upon the opposite edges of each spoke as the latter pass between them, and the cutters are moved out and in to follow the contour prescribed for the spoke by the adjustable gage-piece H H on the chain and tensile springs H' H', respectively, which latter hold the shoes I² on the frame I'. The cutter-heads are driven by endless belts J J, which pass with a quarter-twist around pulleys on the shafts I I, and around driving-drums K K on the main drive-shaft 3, and said shaft is furnished with a loose and fixed pulley M M, through which motion is communicated through a suitable belt (not shown) from the engine or other source of power.

The operator stands at the rear end of the machine and as fast as one of the projecting recesses or sockets C comes into position inserts the end of a spoke therein, and as soon as the following clamp D comes on top it automatically clasps the other end of the spoke. The spoke is then carried through and operated upon and discharged without requiring further attention.

It is evident that slight changes might be resorted to in the form and arrangement of the several parts described without departing from the spirit and scope of my invention, and hence I do not wish to limit myself to the precise construction herein set forth; but, Having fully described my invention, what I claim as new, and desire to secure by Letters Patent, is—

1. The combination, with an endless bed, of a rigid socket thereon adapted to receive one end of a spoke or other article being operated upon, a clamp located on the bed and consisting of a rigid and pivoted jaw, a handle on the latter, and a lug or equivalent device on the bed adapted to strike the handle and automatically force the pivoted jaw in contact with the article to be held, substantially as set forth.

2. The combination, with a frame, cutter-heads, and an endless bed, of a rigid socket located on the latter and adapted to hold one end of the spoke or other article being operated upon, a clamp on the bed, consisting of a rigid and hinged jaw, and means for forcing the jaws of the clamp toward each other while the bed is traveling in a straight line, substantially as set forth.

3. The combination, with a frame, an endless bed or linked table, sprocket-wheels, gearing, and driving mechanism, of cutter-heads, swinging frame, adjustable gages, recesses or sockets, clamps, and lugs or equivalent devices on the endless bed for forcing the clamps together to clasp the article being operated upon, substantially as set forth.

In testimony whereof I have signed this specification in the presence of two subscribing witnesses.

CHARLES SEYMOUR.

Witnesses:
GEO. W. DEATRICK,
M. G. SQUIRE.